US008001056B2

(12) United States Patent
Tesler et al.

(10) Patent No.: US 8,001,056 B2
(45) Date of Patent: Aug. 16, 2011

(54) PROGRESSIVE CAPTURE OF PROSPECT INFORMATION FOR USER PROFILES

(75) Inventors: Lawrence Gordon Tesler, Portola Valley, CA (US); Dennis Chu, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 355 days.

(21) Appl. No.: 12/234,586

(22) Filed: Sep. 19, 2008

(65) Prior Publication Data

US 2010/0076775 A1 Mar. 25, 2010

(51) Int. Cl.
*G06Q 99/00* (2006.01)
*G06Q 10/00* (2006.01)
(52) U.S. Cl. .......................... 705/319; 705/1.1
(58) Field of Classification Search .................... 705/1.1, 705/319
See application file for complete search history.

(56) References Cited

U.S. PATENT DOCUMENTS

| | | | |
|---|---|---|---|
| 2003/0149612 A1* | 8/2003 | Berghofer et al. | 705/10 |
| 2006/0265268 A1* | 11/2006 | Hyder et al. | 705/9 |
| 2006/0265269 A1* | 11/2006 | Hyder et al. | 705/9 |
| 2006/0265270 A1* | 11/2006 | Hyder et al. | 705/9 |
| 2008/0040341 A1* | 2/2008 | York et al. | 707/5 |
| 2008/0140776 A1* | 6/2008 | Horvitz | 709/204 |
| 2008/0288430 A1* | 11/2008 | Friedlander et al. | 706/46 |
| 2009/0106040 A1* | 4/2009 | Jones | 705/1 |
| 2010/0070436 A1* | 3/2010 | Gadanho et al. | 706/12 |

OTHER PUBLICATIONS

Amazon.com: Recommendations, http://www.amazon.com/gp/help/customer/display.html?ie=UTF8&nodeId=13316081, 11 pgs., accessed Feb. 9, 2009.
mate1.com—About Mate1.com, http://www.mate1.com/about?popup=popup, 3 pages, accessed Feb. 9, 2009.
Match.com—Find Singles at the World's Largest Online Dating Personals Service, About Us, http://www.match.com/matchus/help/aboutus.aspx, accessed Jan. 12, 2009, 2 pgs.
Schiaffino, Silvia N. et al., "User Profiling with Case-Based Reasoning and Bayesian Networks," International Joint Conference IBERAMIA-SBIA, Brazil, 2000, 10 pgs.
Lahlou, Abdelkrim "SIM-Filter: User Profile based Smart Information Filtering and Personalization in Smartcard," The 15th Conference on Advanced Information Systems Engineering, Austria, Jun. 16-20, 2003, 11 pgs.

* cited by examiner

*Primary Examiner* — Jonathan Ouellette
(74) *Attorney, Agent, or Firm* — Frommer Lawrence & Haug LLP; Jamie L. Wiegand

(57) ABSTRACT

Embodiments are directed towards inferring an online matching profile based on progressively receiving a prospect's inputs. Access to other matching profiles is provided to the prospect, and while viewing such profiles of other participants, the prospect may progressively provide inputs, such that the prospect's profile may be inferred. As the prospect continues viewing and progressively providing additional inputs, a number of compatibility metrics presented to the prospect may be increased, as does a degree of compatibility of matches that may be suggested to the prospect. At any time during the viewing and progressive input process, the prospect may be presented with their inferred profile. The prospect may then accept and/or modify various elements within the inferred profile.

18 Claims, 13 Drawing Sheets

| Tina's Profile | Tina's About Me | Tina's Ideal Match |
|---|---|---|
| Age | 34 | 30-39 |
| Ethnicity | Caucasian | Caucasian or Hispanic/Latino |
| Height | 5'4" | Taller than 5'4" |
| Body Type | Athletic | Average, or Athletic |
| Wants Children | Yes | Yes |

|  | Tina's Ideal Match | You | Fit |
|---|---|---|---|
| Age | 30-39 | 41 | ★★★☆☆ |
| Ethnicity | Caucasian or Hispanic/Latino | Latino | ★★★★★ |
| Height | Taller than 5'4" | 5'8" | ★★★★★ |
| Body Type | Average, or Athletic | Average | ★★★★★ |
| Wants Children | Yes | Undecided | ★☆☆☆☆ |

|  | Tina describes herself | Adam, does that describe your Ideal Match? |  |  |
|---|---|---|---|---|
|  |  | No | maybe | Yes |
| Age | 34 | ○ | ○ | ● |
| Ethnicity | Caucasian | ○ | ○ | ● |
| Height | 5'4" | ○ | ● | ○ |
| Body Type | Athletic | ○ | ● | ○ |
| Wants Children | Yes | ○ | ● | ○ |

600B

|  | Tina describes her ideal match | Adam, does that describe you? |  |  |
|---|---|---|---|---|
|  |  | No | maybe | Yes |
| Age | 30-39 | ○ | ● | ○ |
| Ethnicity | Caucasian or Hispanic/Latino | ○ | ○ | ● |
| Height | Taller than 5'4" | ○ | ○ | ● |
| Body Type | Average, or Athletic | ○ | ○ | ● |
| Wants Children | Yes | ○ | ● | ○ |

|  | Tina | What is Your Ideal Match? |
|---|---|---|
| Age | 34 | ☐ 18-20<br>☐ 21-29<br>☒ 30-39  706<br>☐ 40-49<br>☐ 50+ |
| Ethnicity | Caucasian | ☐ African-American<br>☐ Asian<br>☐ Caucasian<br>☐ Hispanic/Latino<br>☒ Any |
| Height | 5'4" | ☐ under 5'<br>☐ 5'1"- 5'4"<br>☒ 5'5"- 5'7"<br>☒ 5'8" - 5'10"  707<br>☐ 5'11" - 6'2" |
| Body Type | Athletic | ☐ Athletic/Muscular<br>☐ Average<br>☒ Full-Figured<br>☐ Slender<br>☐ Any |
| Wants Children | Yes | ☐ Yes<br>☒ Flexible<br>☐ Undecided<br>☐ No<br>☐ Any |

*FIG. 7*

|  | Tina's Ideal Match | About You |
|---|---|---|
| Age | 30-39 | Your Age is:<br>[ In years ] 804 |
| Ethnicity | Caucasian or Hispanic/Latino | ☐ African-American<br>☐ Asian<br>☐ Caucasian<br>☒ Hispanic/Latino<br>☐ Any |
| Height | Taller Than 5'4" | Your Height is:<br>[ Feet | inches ] |
| Body Type | Average, or Athletic | ☐ Athletic/Muscular<br>☒ Average<br>☐ Full-Figured<br>☐ Slender<br>☐ Any |
| Wants Children | Yes | ☐ Yes<br>☐ Flexible 807<br>☒ Undecided<br>☐ No<br>☐ Any |

| | Tina describes her Ideal Match | About You | Fit |
|---|---|---|---|
| Age | 30-39 | Your Age is:<br>[In years] | |
| Ethnicity | Caucasian or Hispanic/Latino | ☐ African-American<br>☐ Asian<br>☐ Caucasian<br>☒ Hispanic/Latino<br>☐ Any | ★★★★★ |
| Height | Taller Than 5'4" | Your Height is:<br>[Feet] [inches] | |
| Body Type | Average, or Athletic | ☐ Athletic/Muscular<br>☒ Average<br>☐ Full-Figured<br>☐ Slender<br>☐ Any | ★★★★★ |
| Wants Children | Yes | ☐ Yes<br>☐ Flexible<br>☒ Undecided<br>☐ No  908 | ★★☆☆☆ |

|  | Tina describes herself | Does that describe your ideal match? |
|---|---|---|
| Age | 34 | |
| Ethnicity | Caucasian | |
| Height | 5'4" | ○ ● ○<br>No Maybe Yes |
| Body Type | Athletic | |
| Wants Children | Yes | |

1102

— 1100B

|  | Tina describes her Ideal Match | Does that describe you? |
|---|---|---|
| Age | 30-39 | |
| Ethnicity | Caucasian or Hispanic/Latino | |
| Height | Taller than 5'4" | ○ ○ ●<br>No Maybe Yes |
| Body Type | Average, Athletic | |
| Wants Children | Yes | |

| Tina's Me & My Ideal Match | Adam, does this match what you are looking for? | Adam, describe what you are looking for. |
|---|---|---|
| Just moved back to the Bay from San Diego to start grad school. Would love a man to show me around! I'm getting my masters in social work and will hopefully save the world...as a good faith Christian...I would love to meet someone who is into music and watching sports games...More | ● No   ○ maybe   ○ Yes | Edit<br><br>I like to consider myself a handy person...that's what my co-workers call me too! |

1300B

| Tina's Me & My Ideal Match | Fit | Areas that match |
|---|---|---|
| Just moved back to the Bay from San Diego to start grad school. Would love a man to show me around! I'm getting my masters in social work and will hopefully save the world...as a good faith Christian...I would love to meet someone who is into music and watching sports games...More | ★★★★★ | Education, Friendly, watching sports, listening to music, Christian,... |

PROGRESSIVE CAPTURE OF PROSPECT INFORMATION FOR USER PROFILES

TECHNICAL FIELD

The present invention relates generally to managing user data over a network and, more particularly, but not exclusively to incrementally (or progressively) eliciting user profile data within a profile-matching context.

BACKGROUND

Today, there are a wide variety of Internet websites that employ online matching systems. Such websites might provide services related to online dating, job searching, shopping, and so forth. In a typical online matching system, a profile might be used that involves a set of attributes. For example, in the online dating context, the profile might include attributes such as age, education, and interests. In the online dating context, the descriptions of the attributes might be organized in an "about me" section that specifies a prospect's own attributes and an "ideal match" section that specifies a range of attributes that the prospect considers compatible.

A typical online matching system might provide algorithmic estimates of a compatibility of two participants, A and B, by comparing the "about me" values of each attribute in A's profile with the "ideal match" values for that attribute within B's profile, and vice versa. However, the typical online matching system has every participant provide a detailed profile that typically includes both the participant's "about me" and their "ideal match" descriptions. While this approach enables the online matching systems to base its compatibility estimates on complete data, many prospective participants are reluctant to provide such detailed profile information. As such, at least some of these prospective participants might select to provide false profile information instead. Still others might elect to not participate in the online matching system. In either instance, the prospective participant may either receive poor compatibility results (based at least in part on the false profile information), or fail to receive any results (based on a failure to participate at all).

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 5 illustrates non-exhaustive examples of embodiments of an "about me" and "ideal match" profile and an algorithmic per-attribute compatibility assessment;

FIG. 6 illustrates non-exhaustive examples of embodiments of a mechanism for a participant to provide progressive compatibility inputs;

FIG. 7 illustrates another non-exhaustive example of one embodiment of another mechanism for a participant to provide progressive compatibility inputs;

FIG. 8 illustrates yet another non-exhaustive example of one embodiment of another mechanism for a participant to provide progressive compatibility inputs;

FIG. 9 illustrates another non-exhaustive example of one embodiment of another mechanism for a participant to provide progressive compatibility inputs after which he can view algorithmic per-attribute compatibility assessments;

FIG. 11 illustrates yet another non-exhaustive example of one embodiment of another mechanism for a participant to provide progressive compatibility inputs;

FIG. 13 illustrates another non-exhaustive example of one embodiment of another mechanism for a participant to provide progressive compatibility inputs using textual inputs.

DETAILED DESCRIPTION

Figure 1:
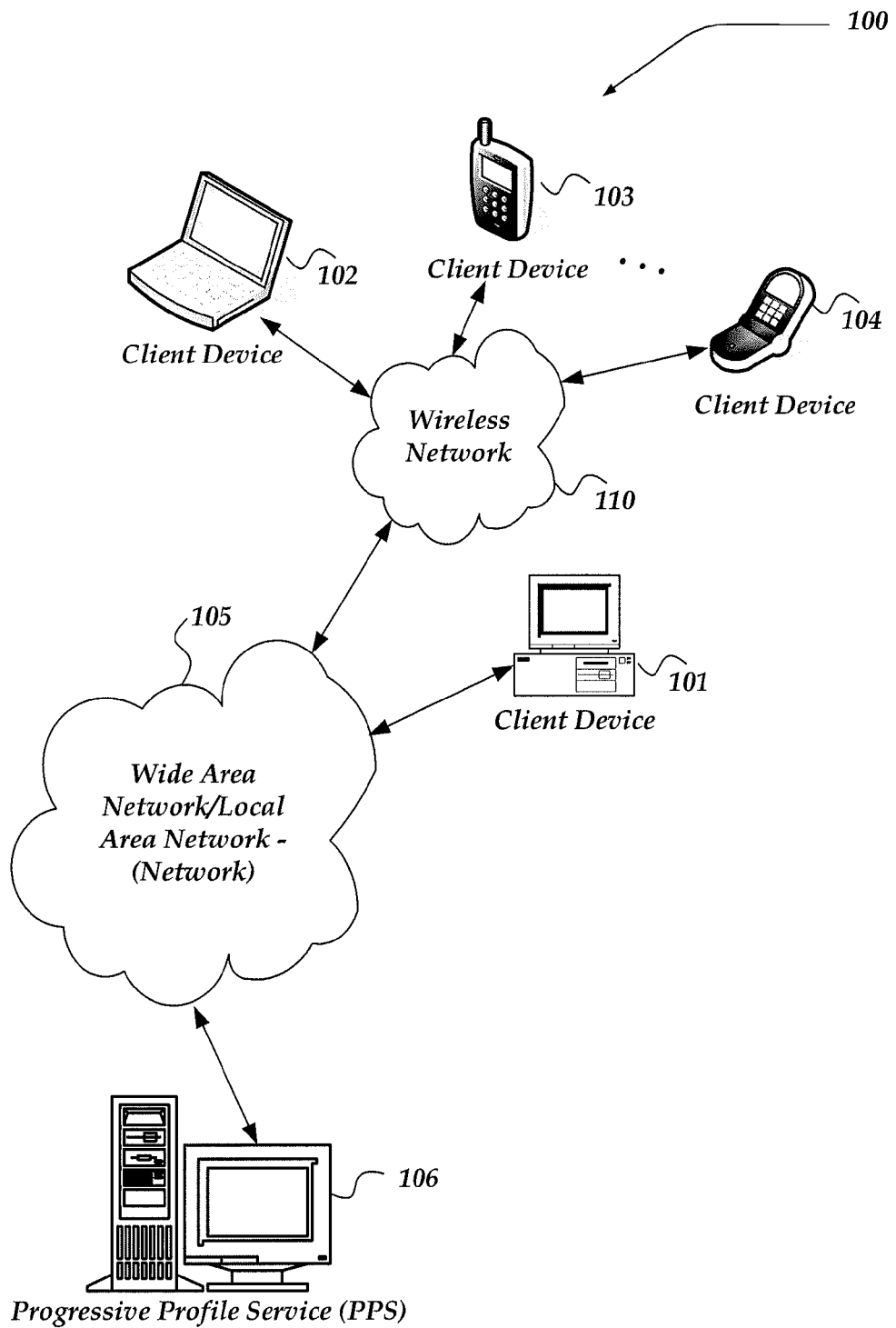
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "infer" means to derive a conclusion from facts or premises. A premise, as used herein, refers to a proposition based on one or more of data, an action, an observation, an opinion, or a fact.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards inferring an online matching profile based on progressively receiving a prospect's inputs. That is, embodiments are directed towards overcoming a prospect's reluctance to complete a matching profile before they have been allowed to view other profiles. Instead of severely restricting an ability of a prospect to view profiles of other participants, an approach described herein enables such actions. That is, access to other matching profiles is provided to the prospect, and while viewing such profiles of other participants, the prospect may progressively provide inputs, such that elements of the prospect's profile may be inferred. The prospect may annotate profiles that they review of others in such a manner that reasonable inferences about the prospect's own profile may be made from such annotations. Based on various events, the prospect also may be provided with the inferred profile (which may include a plurality of manually entered elements in addition to the plurality of inferred elements) and an opportunity to revise and/or concur with the inferences.

In one embodiment, while the prospect is viewing another participant's profile, various input mechanisms are provided by which the prospect can compare the viewed participant's "about me" description with the prospect's ideal match and/or can compare the viewed participant's "ideal match" description with the prospect's self. As the prospect provides these inputs, elements of a profile for the prospect may be inferred.

With each viewing session, additional elements of the prospect's profile may be inferred. As the prospect continues viewing and progressively providing additional inputs, a number of compatibility metrics presented to the prospect may increase, and the compatibility of matching profiles that may be suggested to the prospect may improve. At any time during the viewing and progressive input process, the prospect may be presented with their inferred profile. The prospect may then accept and/or modify various inferred elements within the profile.

While the various embodiments described below illustrate aspects of the invention with respect to online dating or personals, the invention is not so limited. Thus, online matching using progressive capture of prospect information may be employed within employment activities such as matching an employer and job seeker; shopping activities, including but not limited to shopping for autos, travel, real estate, and the like; fantasy sports games such as matching potential players or the like; group matching such as matching groups with a potential member; small business matching, such as a supplier with a buyer or the like. Thus, the invention is not to be limited to the examples described below.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, and Progressive Profile Service (PPS) 106.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, including, for example, interactive televisions, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as PPS 106, or the like. Such user accounts, for example, may be configured to enable the user to receive emails, send/receive IM messages, SMS messages, access selected web pages, or participate in any of a variety of other online matching activities. For example, the user account might enable the user to participate in online dating activities, shopping, fantasy sports, employment activities, and/or any of a variety of other profile matching activities. However, managing of messages or otherwise participating in other profile matching activities may also be performed without logging into the user account. For example, in one embodiment, a prospect might be enabled to visit a profile matching activity through PPS 106 without subscribing to and/or establishing a full user account, without substantially completing a user profile, without paying a membership, and/or performing selected other activities directed toward enabling full use of the profile matching services.

A user of client devices 101-104 may employ any of a variety of client applications to access content, read web pages, receive/send messages, perform profile matching, or the like. In one embodiment, each of client devices 101-104 may include an application, or be associated with an application that resides on the client device or another network device, that is useable to view profiles of other participants to a profile matching service through PPS 106. The client applications may enable the prospect to progressively provide information that may then be used by PPS 106 to infer elements of a profile for the prospect. In one embodiment, the client application might include a web browser that provides access to various user interface screens such as those described below in more detail in conjunction with FIGS. 5-11 and 13.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple PPS 106, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

PPS 106 includes virtually any network computing device that is configured to provide an online profile matching system or service that progressively captures inputs useable to infer elements of a user's profile. Thus, PPS 106 represents one embodiment of an online profile matching system. In one embodiment, PPS 106 is configured to provide various user interface screens that may be used for viewing a participant's profile, and/or progressively providing a prospect's inputs. Examples of such interface screens are described in more detail below. PPS 106 may progressively capture the prospect's inputs and infer additional elements of the prospect's profile. PPS 106 may, based on various criteria, provide a display of the prospect's inferred profile, such that the prospect may accept it, and/or modify the inferred profile.

In one embodiment, PPS 106 might allow the prospect to view profiles of other participants with little or no initial information provided directly by the prospect for use within the prospect's profile. Thus, in one embodiment, the prospect might be allowed to select from various other participant's profiles. In one embodiment, inferences may be made by PPS 106 based on which profiles are selected for viewing. As a non-exhaustive non-limiting example, suppose that the prospect selects to review only profiles of women. An inference may then be made that the prospect seeks a relationship with women. Similarly, as the prospect seeks to review only those profiles of women within a particular age range, national origin, or the like, similar progressive inferences may be made.

In one embodiment, virtually no limitation as to a number of profiles viewed, a time in which to view the profiles, or the like, might be placed upon the prospect's activities. However, in one embodiment, in order for the prospect to communicate with another participant within the profile-matching activity, PPS 106 might impose various requirements. Such imposed requirements might include, but are not limited to: having a profile completed with at least a predefined set of elements; having paid a fee; having subscribed as a member; having agreed to be shown advertisements; having agreed to the published terms of use of the service; or the like. The invention is not limited to such requirements, however. For example, in another embodiment, no such requirements might be imposed. In any event, PPS 106 may employ a process substantially similar to that described below in conjunction with FIGS. 4 and/or 12.

Devices that may operate as PPS 106 include, but are not limited to personal computers, desktop computers, multiprocessor systems, microprocessor-based or programmable consumer electronics, network PCs, servers, network appliances, and the like.

Although PPS 106 is illustrated as a distinct network device, the invention is not so limited. For example, a plurality of network devices may be configured to perform the operational aspects of PPS 106. For example, in one embodiment, user interface screens may be provided within one or more network devices, while the generation of inferences from a prospect's inputs may be performed within one or more other network devices. Conversely, a single network device may perform multiple functions in addition to those associated with progressive profiles.

Illustrative Client Environment

Figure 2:
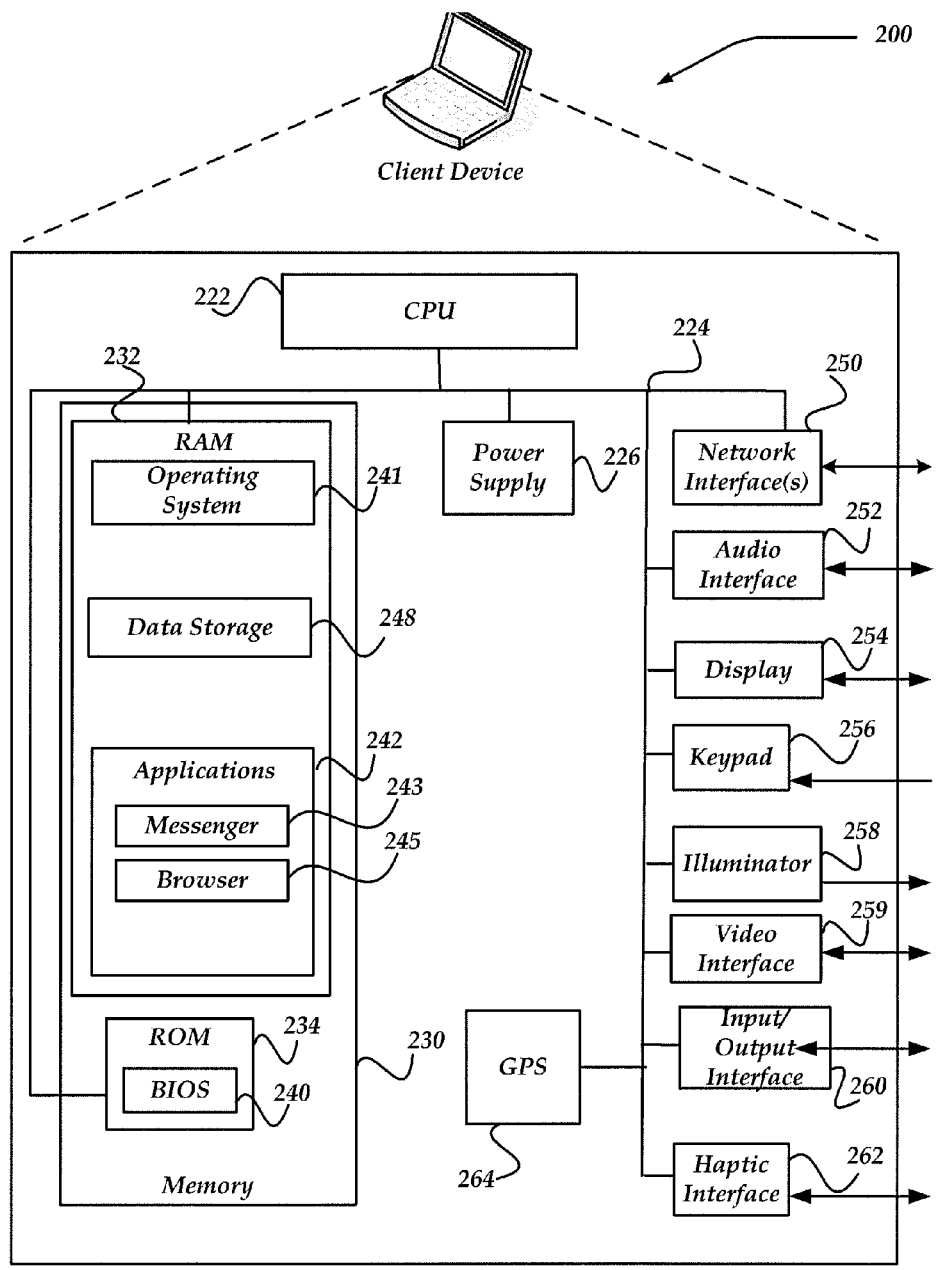
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 248 may also be employed to store personal information including but not limited to contact lists, personal preferences, data files, graphs, videos, or the like. Data storage 248 may further provide storage for user account information useable with one or more online matching services, or the like. At least a portion of the information may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may also be employed. In any event, browser 245 may be used to enable a user to participate in an online matching service.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols.

Illustrative Network Device Environment

Figure 3:
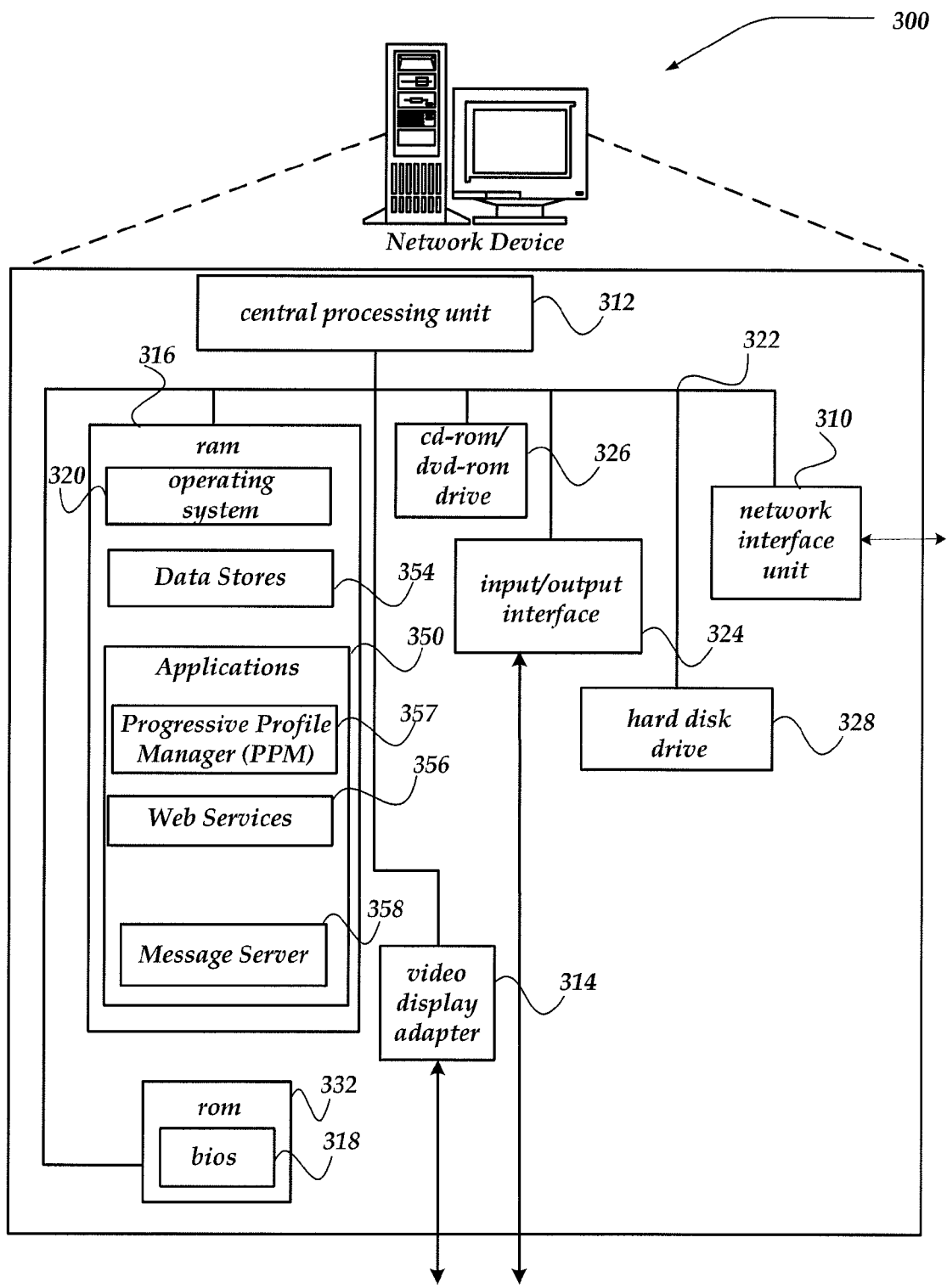
FIG. 3 shows one embodiment of a network device that may be included in a system implementing the invention.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may represent, for example, PPS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data stores 354. Data stores 354 may be include virtually any mechanism usable for store and managing data, including but not limited to a file, a folder, a document, or an application, such as a database, spreadsheet, or the like. Data stores 354 may manage information that might include, but is not limited to web pages, information about members to a social networking activity, contact lists, identifiers, profile information, tags, labels, or the like, associated with a user, as well as scripts, applications, applets, and the like. Data stores 354 may further include information about a prospect including, but not limited to inferences made, whether the prospect has confirmed and/or modified an inferred profile element, or the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, Message Server (MS) 358, and Progressive Profile Manager (PPM) 357.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. In one embodiment, web services 356 may interact with PPM 357 to display various screen interfaces useable to enable a user to participate in online matching service.

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types.

PPM 357 is given to provide various user interface screens to web services 356 for use in displaying and/or receiving user inputs for use in an online matching service. In one embodiment PPM 357 may therefore store such screen interfaces, profile information, and other information useable in the online matching service in data stores 354. PPM 357 may receive inputs from a user, match inferences about the user's profile, and provide the inferred profile to the user for verification and/or modification. PPM 357 may also provide such inputs from the prospect, or other user, and save such information in data stores 354.

PPM 357 may further manage communication access between participants of the online matching service. For example, in one embodiment, PPM 357 might impose various constraints upon communications between participants that may include, but are not limited to a participant's profile including at least a defined set of elements, the participant having paid a fee, or a variety of other constraints. However, in one embodiment, PPM 357 might not impose any constraints to enable communications between participants. In any event, PPM 357 might employ processes such as described below in conjunction with FIGS. 4 and 12 to perform at least some of its actions.

Generalized Operation

Figure 4:
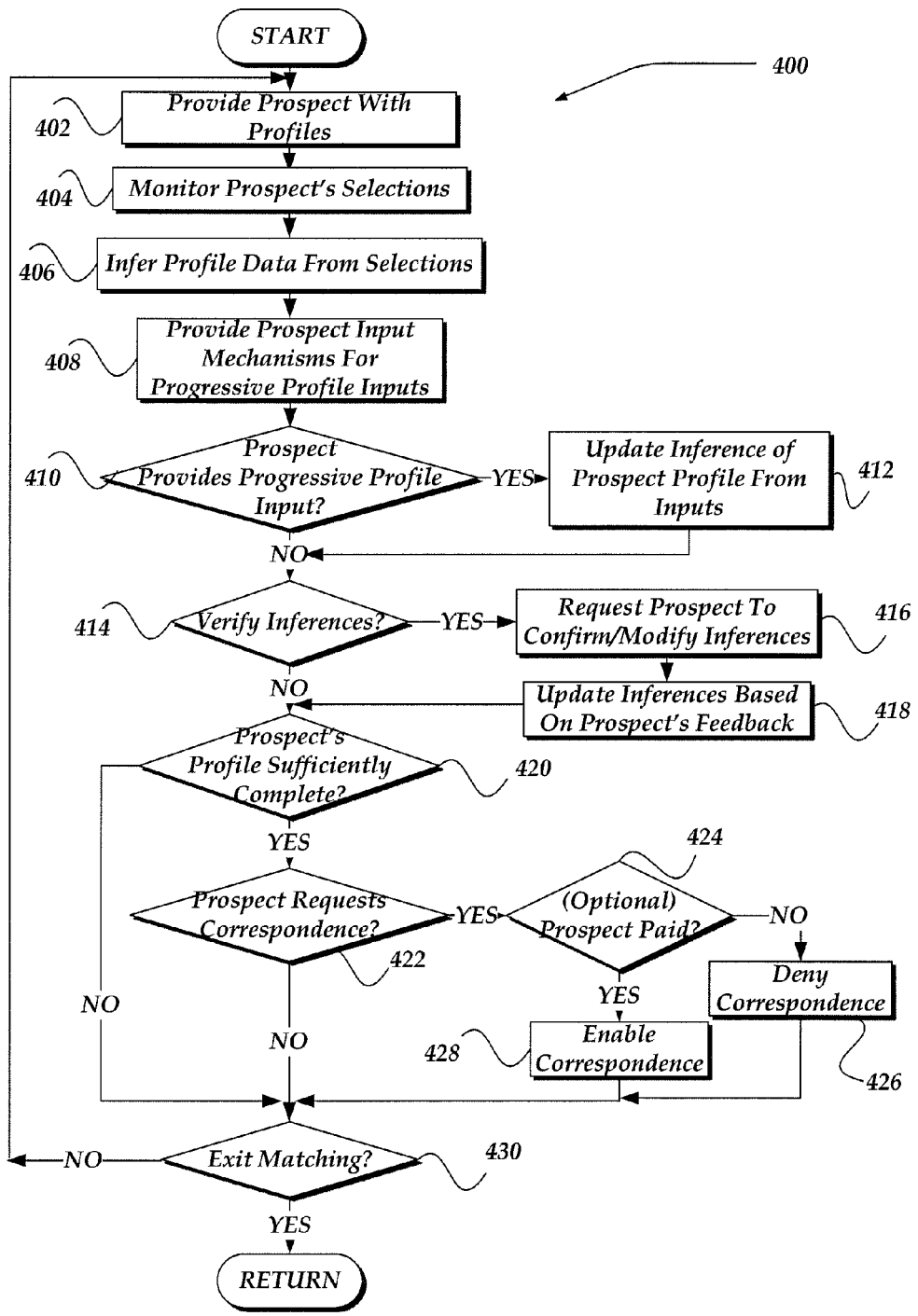
FIG. 4 illustrates a logical flow diagram generally showing one embodiment of a process for performing progressive captures of information useable in a user profile.

The operation of certain aspects of the invention will now be described with respect to FIG. 4. FIG. 4 illustrates a logical flow diagram generally showing one embodiment of a process for performing progressive captures of information useable in inferring elements of a user's profile. Process 400 of FIG. 4 may be implemented within PPS 106 of FIG. 1, for example, in one embodiment, or across a plurality of network devices similar to, albeit different from, network device 300 of FIG. 3.

In any event, process 400 begins, after a start block, at block 402, where a prospect is offered one or more mechanisms by which to select other participants' profiles to view, such as a gallery of photos of other participants, a means of searching by specific participant profile criteria like age, education, and geographic location, or a means of searching for participant profiles that are considered to match one's own. In this block, the prospect may have simply directed their browser to the progressive profile matching site, and requested access to view one or more profiles at the site. In one embodiment, the request for access to view the one or more profiles might not require the prospect to identify themselves. In another embodiment, at least a name, alias, address, or other identifier might be requested. In one embodiment, a network address of the prospect's client device might be automatically obtained, such that inferences about the prospect might be collected over several sessions for the prospect—assuming, that the prospect accesses the matching site from a same network address.

Processing continues to block 404, where the prospect may choose to view one or more profiles of participants in the online matching system using one of the profile selection mechanisms offered at block 402. Actions of the prospect may then be monitored. For example, the prospect might be initially provided a default set of profiles based on information that may be initially inferred about the prospect, such as a geographic location (from the network address), a gender (should the prospect provide a name or other alias), or the like. For example, in one embodiment, in an online dating profile service, photos of both male and female participants might be initially provided to the prospect. Monitoring of the prospect's photo selections might indicate a preference for female profiles, male profiles, or even a combination of male/female profiles. For another example, in one embodiment of an online dating profile service, a prospect may fill out a form to initiate a search for participants age 40-49 who have graduated from high school. Monitoring of the prospect's search criteria might indicate a preference to meet people between 40 and 49 years of age who have at least a high school education. Thus, based on monitoring the prospect's actions, processing proceeds to block 406, where various inferences about the prospect may be made based on the prospect's selections.

Process 400 continues to block 408, where, as the prospect is provided with more information about another participant via the other's profile, various mechanisms may be provided to the prospect to solicit input. Non-limiting, non-exhaustive example mechanisms for an online dating service are described in more detail below in conjunction with FIGS. 5-11, and 13. As may be seen from such examples, a prospect may elect to input some additional information into the screen inputs, or no information into the screen inputs.

As the prospect is provided with a display of one or more input mechanisms, the prospect may elect to progressively provide input. Thus, progressing to decision block 410, a determination is made whether the user has progressively provided input. If so, processing flows to block 412; otherwise, processing proceeds to decision block 414.

At block 412, based on the prospect's progressive input, various inferences may be made, modified, and/or the like. Such inferences about the prospect may be made using a variety of mechanisms. Examples of at least one approach are described in more detail below, in conjunction with FIG. 12. The progressive inferences may then be stored in a data store associated with the prospect. Processing flows to decision block 414.

At decision block 414 a determination is made whether to request that the prospect verify at least some of the inferences about the prospect's profile. When the request may be made for verification may be based on a variety of criteria. For example, if the prospect has viewed a defined number of other profiles, then a request for verification might be made to the prospect. After a defined number of inferences have been made, may also be when it may be appropriate to request verification of the prospect's profile. In one embodiment, if the prospect has frequented the matching service for some defined number of times, has provided little or no inputs, or has made no additional defined actions, then the prospect might be solicited to verify their profile. Similarly, when the prospect seeks to communicate with a participant in the profile matching service, then a request may be made to the prospect to verify their profile. Thus, as may be seen, virtually any criteria, time, event, or the like, might be employed to trigger a request for profile verification. In any event, if the profile is to be verified, processing flows to block 416, where a display is provided to the prospect requesting verification of the prospects' inferred profile. Processing may flow next to block 418, where the prospect may elect to update/verify one or more aspects of their profile. It is anticipated that in one embodiment, the prospect may elect to not verify their inferred profile. Thus, in one embodiment, the prospect might be allowed to cancel out of the verification process. In one embodiment, a message might be displayed to the prospect, indicating an advantage in verifying their inferred profile, and offering the prospect with another opportunity. If the prospect provides verification, such information may be used to modify the prospect's profile and replace inferred values of one or more attributes by verified values. Processing flows then to decision block 420.

At decision block 420, a determination may be made whether the prospect's profile is considered to be sufficiently complete to enable fuller access to other participants or their profiles. Although this decision may be optional, it provides for an opportunity to ensure that the prospect has verified, or otherwise provided enough information about themselves such that a meaningful inference may be made about the prospect. In one embodiment, such analysis might include a statistical analysis as to whether a confidence level in the inferences about the prospect exceeds some threshold. In another embodiment, it might include whether the prospect has verified their profile. In still another embodiment, sufficiency might be based on whether fluctuations over a defined time of each inferred attribute value are below a defined threshold value. That is, changes in an inferred attribute are determined to be less than some defined threshold, indicating a level of desired stability.

Virtually any criteria for determining whether the prospect's profile is sufficiently complete may be made, including for example, whether certain attributes in the prospect's profile have been inferred by the PPM, verified by the prospect, or manually entered into a form field by the prospect. Other criteria may also be used. In any event, if the prospect's profile is considered to be sufficiently complete, processing may flow to decision block 422; otherwise, processing may loop to decision block 430.

At decision block 422 a determination is made whether the prospect has requested correspondence with another participant in the online profile matching system. If so, processing flows to decision block 424; otherwise, processing flows to decision block 430. At decision block 424, a determination may be made whether the prospect has paid a fee. Such determination may be optional. For example, instead, a determination might be whether the prospect has registered as a member, and/or performed some other action. Thus, an online profile matching system might impose no additional requirements or one or more additional requirements before communications between participants is permitted. Such requirements might be imposed to ensure safety, security, and/or privacy between participants. If requirements are imposed, and satisfied, processing may flow to block 428; otherwise, processing flows to block 426. At block 426, the prospect might be notified that communications with another participant is denied. In one embodiment, the prospect might be offered an opportunity to satisfy the requirements, such that a subsequent request to communicate with a participant might not be denied. If the prospect declines the offer, processing may flow to decision block 430; otherwise, processing could (although not shown) loop back to decision block 424. At block 428, however, the prospect might be allowed to communicate with the other participant. In one embodiment, the profile matching system might buffer the communications using a variety of mechanisms. For example, in one embodiment, the system might send a message to the other participant indicating that the prospect wishes to communicate with them, provide the prospect's profile, and request whether the participant agrees to the communication. Then, if the participant agrees, the communication might be enabled. Processing then flows to decision block 430.

At decision block 430, a determination is made whether the prospect has elected to exit the profile matching system. If so, processing returns to a calling process to perform other actions; otherwise, processing may loop back to block 402, where the prospect may continue to view other profiles.

In one embodiment, once a prospect has either manually entered an attribute value into their profile or verified an inferred attribute value, that attribute may no longer be included in the operation of process blocks 404, 406, 408, 410, 412, 414, 416 and/or 418, and the value associated with that attribute may only be changed by the prospect through a process of editing their own profile. However, in another embodiment, the prospect may continue to be allowed to provide progressive input while viewing other participants' profiles, in which case, a different value of the attribute may be inferred and presented to the prospect for verification.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Non-Limiting, Non-Exhaustive Examples

The following provides examples of various profile matching screens usable to infer and/or otherwise manage progressive profile matching. As noted above, progressive profile matching may be used in a variety of contexts, including but not limited to employment activities, shopping activities, fantasy sports, business transactions, educational transactions, or the like.

In any event, and without loss of generality, various embodiments described below describe the invention within an online dating service. In the non-limiting, non-exhaustive examples, a prospect is used that is a male named Adam who wishes to find a compatible female. Adam views profiles previously posted by one or more female participants, one of whom is named Tina.

FIGS. 5-11 and 13 provide various screen displays useable within progressive profile matching systems. Each of the FIGURES may include many more components than those shown. The components shown, however, are sufficient to disclose an illustrative embodiment for practicing the invention.

FIG. 5 illustrates non-exhaustive examples of embodiments of an "about me" and "ideal match" profile and an algorithmically determined compatibility assessment performed and displayed on a per-attribute basis. As shown, FIG. 5 illustrates screens 500A and 500B. Screen 500A represents one embodiment, of a display of a participant's "about me" profile (middle column), and an "about my ideal match" (right column). One benefit or providing a complete profile such as FIG. 5 is that it allows one to search for other participants whose profiles can readily be used to determine compatibility.

Another benefit is that an online matching system can present calculated compatibility estimates to a prospect. Thus, screen 500B illustrates one embodiment, of a display showing, on a per-attribute basis, calculated estimates of compatibility (herein called "fit") between a viewing prospect's self-description and the viewed participant's ideal match. As shown, screen 500B employs a star approach to display compatibility; however, virtually any other mechanism may be used.

FIG. 6 illustrates non-exhaustive examples of embodiments of a mechanism for a participant to provide progressive compatibility inputs. As shown in FIG. 6, screen 600A illustrates one embodiment of a display of "Adam's" assessment of compatibility between "Tina" and his ideal match, see column 602. Screen 600B provides Adam's assessment of compatibility between Tina's ideal match and himself, see column 604. In one embodiment, a rating widget, such as the illustrated button widgets may be displayed next to each attribute of the viewed participant. The prospect may then operate the widget to provide inputs, such as by clicking within the circle, or the like, to rate the match. When the prospect rates the viewed participant's "about me" value a good or bad match to their ideal, the invention may adjust a value of the corresponding attribute with the "ideal match" section of the prospect's inferred profile. When the prospect rates the viewed participant's "ideal match" value a good or bad match to themselves (screen 600B), the invention may adjust a value of the corresponding attribute within the "about me" section of the prospect's inferred profile. Thus, as the prospect rates the profiles of others, the invention may incrementally build up an inferred profile of the prospect.

As shown in FIG. 6, a rating widget may offer more than two choices. For example, as shown in FIG. 6, three choices may be provided to allow the prospect to distinguish three degrees of match. However, the invention is not constrained to three choices, and other values may also be provided. For example, the prospect might be offered two choices, 4 choices, 5 choices, or even an opportunity to 'fill in the blank,' such as illustrated in FIGS. 8-9.

Moreover, the rating widget might depict the choices as letters (such as A-B-C), numbers (such as 1-2-3), words (such as yes-maybe-no), symbols (such as sun-cloud-rain), colors (such as green-amber-red), images (mouths that are smiling, relaxed, frowning), or even combinations of such elements, or as virtually any other depictions that one might expect a prospect to be able to recognize as having the intended meaning and to be able to distinguish visually or through some other sense or combination of senses. The examples shown in FIG. 6 depict choices as words (No-maybe-Yes), each of which is accompanied by a hollow round symbol known in the art as a "radio button." When one radio button in a set is chosen (e.g. clicked), it is filled in while the other members of the set are made hollow. Until the prospect has chosen one of a set of radio buttons, in one embodiment, none of them might be filled in, while in another embodiment, a default button might be filled in. However, as noted, other mechanisms may also be used.

In one embodiment, rather than operating a rating artifact to indicate a closeness of a match, a prospect may be invited to enter an acceptable range of values for their ideal match. For example, FIG. 7 illustrates another non-exhaustive example of one embodiment of another mechanism for a participant to provide progressive compatibility inputs. As shown in screen 700, the prospect may be allowed to select range values as shown in selections 706 and 707 of FIG. 7. Such range values may be selected from a variety of ranges, determined based on a number of sets desired, such as 5, as shown in column 702, or some other set of ranges.

Thus, as shown, the prospect might be allowed to make selections, and/or modify inferred selections. Thus, for example, age selection 706 might be an inferred item based on inputs by the prospect. For example, the prospect might elect to view a plurality of other participant's profiles that have ages within a particular range, from which range the age range of the prospect's "ideal match" may be inferred.

In a similar mode, an inference of the height of the prospect's ideal match might be made resulting in selections of multiple ranges, such as shown in multiple selections 707. It should be noted, that the prospect might also select multiple boxes for ranges of one or more of the listed attributes. Moreover, at any time, the prospect might elect to modify the selection for one or more attributes by merely 'deselecting' one or more selections, and selecting a different one or more selections.

FIG. 8 illustrates yet another non-exhaustive example of one embodiment of another mechanism for a participant to provide progressive compatibility inputs. Screen 800 of FIG. 8 provides input mechanisms 802 that include a fill in the blank capability 804 along with a selection 807 mechanism. It should be noted, that in one embodiment, at least some of the input mechanisms 802 may also be pre-completed based on an inference determination. Thus, for example, based on input from the prospect, for example, an inference might have previously been made that the prospect's body type is average (as illustrated in FIG. 8 as being pre-completed) and/or that the prospect's desire for children is "undecided."

FIG. 9 illustrates a variation of the embodiment of FIG. 8 in which compatibility assessments are algorithmically computed on a per-attribute basis and displayed to the prospect. As shown, screen 900 of FIG. 9 may illustrate a compatibility assessment based on partial profile data. Thus, for example, fit measurements 903 might be shown as incomplete, as indicated by the "fit" column 903 and/or the "about you" column 902, where the fit column 903 might include assessment 908 about the compatibility between Tina and Adam in terms of desire for children, but no assessment of their compatibility in terms of Adam's height (which is not yet established) vs. the height of Tina's idea match.

In another embodiment, the invention may present attributes of an inferred profile to a prospect, optionally interwoven with explicitly provided and/or previously confirmed attributes, and allow the prospect to edit the attributes to make corrections before confirming their validity.

Figure 10:
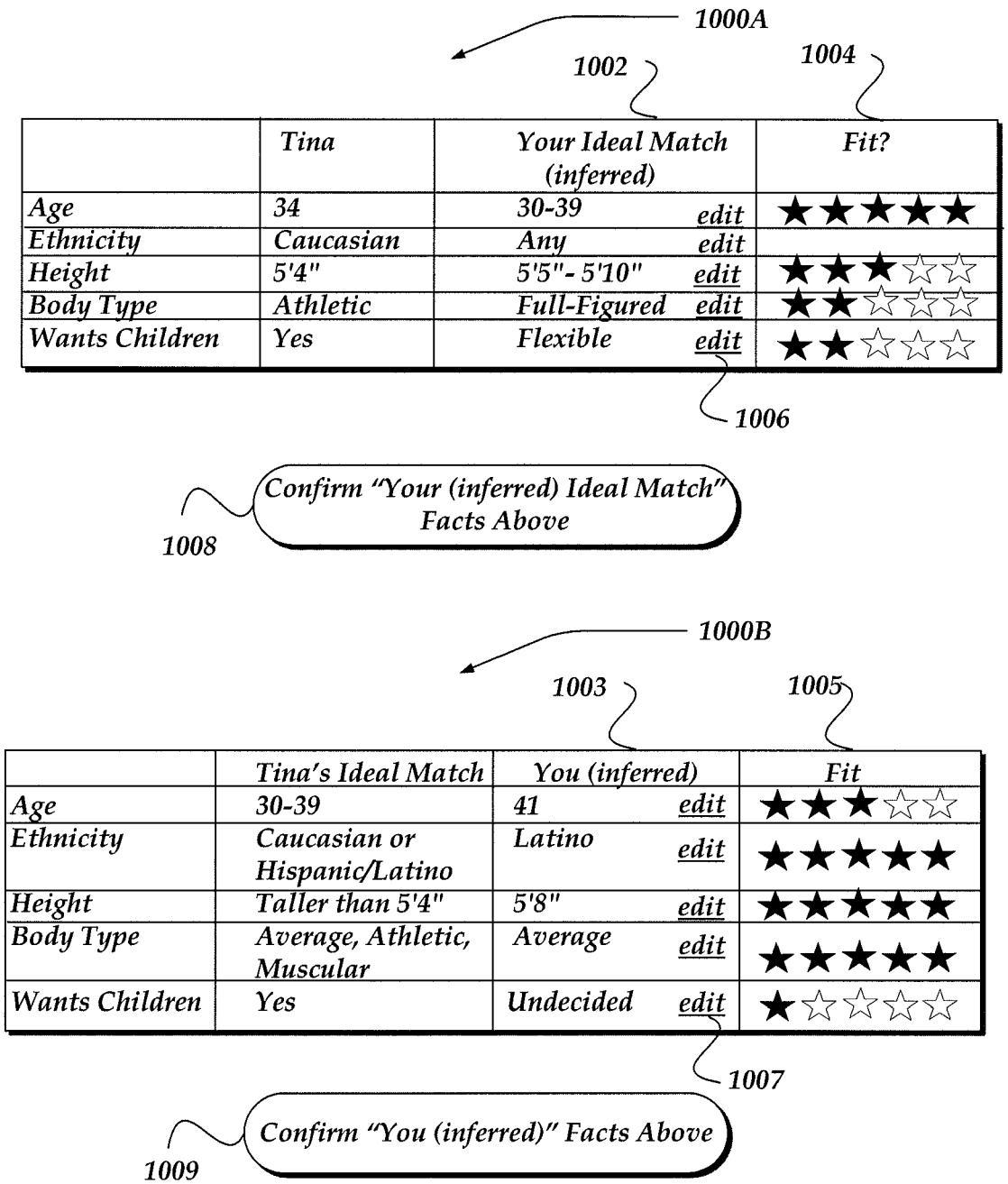
FIG. 10 illustrates a non-exhaustive example of one embodiment of displaying inferred assessment profile information and enabling a participant to confirm and/or modify such information.

FIG. 10 illustrates a non-exhaustive example of one embodiment of displaying inferred assessment profile information and enabling a participant to confirm and/or modify such information. As shown, in screen 1000A the prospect is shown "your ideal match (inferred)" column 1002, fit column 1004, with edit selectors 1006. Similarly, screen 100B provides to the prospect "you (inferred)" 1003 and fit column 1005. Again, the prospect may employ edit selectors 1007 to modify their inferred profile. At any time, the prospect may then click on the confirm buttons 1008 and/or 1009 to confirm their "inferred ideal match" (1008) or confirm their "inferred facts" (1009) about themselves.

In one embodiment, ratings may be remembered. When the prospect returns to a previously viewed participant's profile, the prospect's previous rating of that participant may be shown. Again, the prospect may be provided with an opportunity to modify their profile.

In one embodiment, if the prospect modified their answers when viewing another participant's profile, then the prospect's inferences and revised answers may be reflected in each of the other viewed participant's profiles. For example, consider where the prospect (in our example, Adam), either inputs a different ethnicity than what was input (or inferred from Adam's selections) while viewing Tina's profile. Later, Adam either modifies his input, or the invention modifies it based on changes in Adam's selections while viewing another's profile. Then, when again viewing Tina's profile, Adam's ethnicity may be automatically revised. However, in another embodiment, while Adam's inputs result in inconsistencies across viewed profiles, such inconsistencies may be highlighted across the viewed profiles. In this manner, the prospect may be offered an opportunity to resolve the inconsistencies.

If a prospect viewing another participant's profile does not enter data intended to appear in their own profile as in FIGS. 7, 8 and 9, but instead rates the fit between the data that would be in their profile and the data in the viewed participant's profile as in FIGS. 6 and 11, then, as previously discussed, the invention may infer the data that might be in the prospect's profile. Numerous inference mechanisms may be used. One such approach is described in more detail below.

FIG. 11 illustrates yet another non-exhaustive example of one embodiment of another mechanism for a participant to provide progressive compatibility inputs. As may be seen, screen 1100A and 1100B illustrate that inputs by the prospect may, in another embodiment be offered an opportunity to provide an overall assessment of compatibility, rather than select to provide inputs for a variety of attributes. Thus, as shown in screens 1100A and 1100B, a user might provide a single input 1102 to a question such as "does [Tina's] description describe your ideal match?", or "does [Tina's description of her ideal match] describe you?" with a single input 1103.

In still another embodiment a prospect may be offered an opportunity to provide a written input rather than select from a variety on input widgets. Thus, FIG. 13 illustrates non-exhaustive example screens 1300A and 1300B of embodiments of another mechanism for a participant to provide progressive compatibility inputs using textual inputs. As shown in column 1 of screen 1300B, the prospect might be able to enter, in a free-form, text to describe themselves and their ideal match, either in separate text entry fields for them and their ideal match, or, as shown in 1300B, mixed together within a single "me and my ideal match" text entry field. The invention may then parse attributes from the inputs, both of the prospect's and/or the other participant's profile of the inferred profiles, and match against the prospect's existing attributes. For example, if Tina's "me and my ideal Match" section includes a phrase, such as "I also enjoy skiing . . . " the invention can detect the phrases "skiing," "ski," or the like. In one embodiment, the invention may also recognize related phrases, such as "snowboarding," "snowboard," or the like, and match these against Adam's selected standard attributes. Thus, the invention may be configured to detect multiple attributes from Tina's "me and my ideal match" section and match with Adam's profile. As shown in screen 1300B, the invention may further provide a fit rating of the "me and my ideal match" section using any of a variety of compatibility estimation algorithms. The example in screen 1300B includes, along with the fit rating, an informative list of matching areas inferred by comparing Tina's "me and my ideal Match" text with both Adam's text entry in 1300A and Adam's standard attributes (not shown) In yet another embodiment, a rating widget might appear as shown in 1300A, that works in the same way as the corresponding mechanisms shown in FIGS. 6 and 11, but work on words, phrases and numbers found in free text instead of on values of constrained form fields.

Illustrative Aggregation Algorithm

Next is described but one of a variety of possible mechanisms for aggregating inputs from a prospect useable for progressively inferring the prospect's matching profile. It should be noted that the following aggregation is not to be construed as the only available approach, and others may also be used. Instead, the invention may employ any of a variety of aggregation approaches without departing from the scope of the invention. Thus, FIG. 12 illustrates one non-exhaustive, non-limiting embodiment of a process for determining an aggregation assessment for a prospect.

Figure 12:
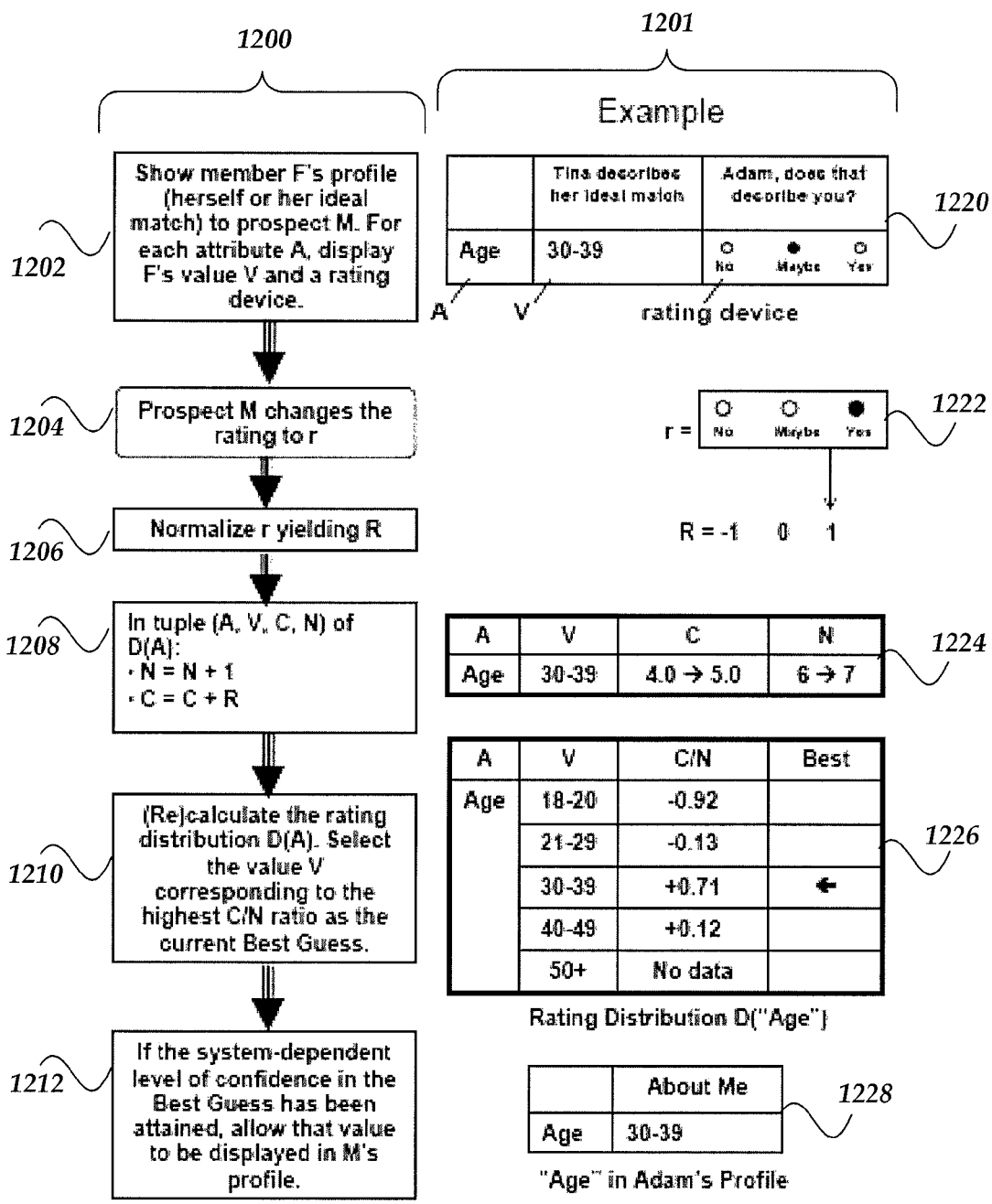
FIG. 12 illustrates one non-exhaustive example of employing a process for determining an aggregation assessment for a participant.

Shown in FIG. 12 is process 1200 along with a simplified example 1201 to assist in understanding. Process 1200 starts at block 1202, where an online matching member's (F) profile may be viewed by a prospect (M). For attribute A, the member's value V may be displayed, along with various rating input mechanisms. As shown in example, 1201, the attribute A is represented by age, the member's value V represented by 30-39, and the rating input mechanism is shown as a selection widget at example block 1220. In one embodiment, the shown rating might be a previously entered value by the prospect, or an inferred value.

Moving to process block 1204, the prospect (M) may change a rating from a current value to another value. As shown in example block 1222, the prospect changed the rating (r). At process block 1206, every rating may be normalized to a number between, for example, −1 and 1, where −1 might represent a worst possible fit and +1 might represent a best possible fit. It should be noted that other normalization ranges may also be selected, and thus the invention is not limited to this range. For example, 0 to 1 might also be used.

In any event, as shown in example block 1220, three choices were offered for an attribute, where the choices were non-numeric. In that instance, a 'no' might be valued as −1, a 'yes' might become +1, while a 'maybe' might assume an intermediate value chosen by a system designer based on statistical analysis, historical studies, or the like. In one embodiment, intermediate values might be set to 0.2; however, other values may also be selected. Where the attribute includes more than three choices, the other selections might be biased with values tending towards a normalized distribution. In the example of FIG. 12, a "maybe" is equivalent to the absence of any response and is valued as 0.

Continuing with the example, the process may then move to block 1208, where ratings are collected not only during the prospect's viewing of a current profile F, but also during viewing of other participants' profiles. For each attribute A, a rating distribution, D(A), may be calculated that may be composed of tuples (A,V,C,N). The rating distribution may include one tuple for each possible value V of attribute A. If the values V form a linear (equally spaced) sequence of number, D(A) can be represented as a pair of indexed arrays c[i] and n[i]. In another embodiment, it can be represented as a pair of hash tables. However, the invention is not limited to these representations, and other suitable and efficient representations for the tuple sets may also be employed to accommodate the range of possible values V in each set D(A).

In any tuple (A,V,C,N), C represents a sum over all rated participants of the normalized ratings R that the prospect gave to profiles with the value V for attribute A and N representing the number of participants so rated.

For some attributes, a profile value might be a range. For example, the profile may provide age ranges such as 20-29 and 30-39 as choices for one's ideal match. In one embodiment, each range may be associated with a single tuple. For example, the value of V in one particular tuple of D(A) might be the range 30-39, as illustrated in example block 1224. A normalized rating of 1 might add 1 to C in that tuple whether the rated profile entry was the range 30 to 39 or some value within that range (for example, age 37).

The rating distribution D(A) may then be calculated at process block 1210 incrementally. Whenever the prospect M views the profile of a new participant and provides a rating for value V of attribute A, the normalized rating R may be added to C in the tuple (A,V,C,N). If the prospect M later edits a rating, the old normalized rating may be subtracted from C and the new normalized rating R may be added to C. The more profiles that M views, the more information that may be gleaned about M's own profile to improve the inferences.

If a participant is allowed to provide more than one value for a particular attribute, then another approach may be employed. For example, as shown in FIG. 6, Tina described her body type for her ideal match as being "average or athletic." Adam rated the match as "yes," which, after normalization, would have a value of +1. Adam's rating would then affect two tuples in D("body type"), namely ("body type," "average," C1, N1) and ("body type," "athletic," C2, N2). One approach might be to add 1 to each of the tallies C1 and C2. However, doing so might give Tina's profile twice the impact of the profile of another who provided only one value. Adding ½ to C in each tuple might therefore avoid that difficulty. Similarly, a rating of "no" in the same location might result in the addition of the negative number −½ to C in each tuple.

A best guess inference for the value of attribute A can be calculated at any time from the accumulated rating distribution by determining the attribute value or range with the greatest C/N ratio. However, the accuracy of such inferences might be poor until the prospect has viewed a sufficient number of profiles with a sufficient variety of values for each attribute. In some embodiments, a confidence level associated with each inferred attribute value is calculated whenever the rating distribution of that attribute is calculated. In one embodiment, the confidence level might be calculated as a constant multiple of the number of profiles viewed, reaching a maximum level of confidence after a fixed number such as 10-40 profile views. In another embodiment the confidence level might rise as the sequence of inferred attribute values converges. For example, the confidence level might be calculated as the reciprocal of one plus the weighted standard deviation of recent inferred values, where the most recent value might be given the most weight, reaching a maximum level of confidence when all recent inferred values are equal.

Proceeding to process block 1212, once a threshold level of confidence in an inferred attribute value has been reached, the inferred value might be used by the online profile matching service in much the same way as it would use a value that the prospect had entered into his own profile, In one embodiment, the inferred value is displayed in views of the prospect's profile seen by the prospect and/or other participants, perhaps with a visual indication of the level of confidence in the inference. In another embodiment, the inferred value is used in the profile matching service's algorithmic search to find participant profiles that match the prospect's profile. It should be noted, however, that a fixed threshold level of confidence need not be reached before the inferred value can be used in matching. Alternatively, an inferred value of an attribute might always be used in matching, but the influence of said attribute in the profile matching algorithm might rise as the level of confidence in the inference increases.

In another embodiment, the prospect need not rate each attribute separately. Instead, a rating artifact might appear beside a whole set of attributes or even a whole profile. See for example, FIG. 11. This approach may reduce the work that the prospect might perform. The invention may then infer likely attribute values by identifying attributes whose values are similar among high-rated profiles, and/or different among low-rated profiles.

One embodiment to do this includes assigning a rating of the entire attribute set to each attribute singly before applying an aggregation algorithm, such as described above in conjunction with FIG. 12. Because an overall rating provides less information about each attribute than a per-attribute rating, it may take more profile views for a sequence to converge.

Another embodiment to inferring a prospect's profile from input ratings of other participant's overall profiles includes applying collaborative filtering. In this embodiment, a search of a profile data store for men (in the current examples) who gave a same or very similar rating to a set of relevant women and then synthesizing those profiles into a profile for the prospect using the above aggregation algorithm. The 'relevant women' might be most or all of the women whose profiles the prospect rated. In practice, there may often be an insufficient number of such women to perform an analysis. Another approach therefore might include a definition of 'relevant women' whose profiles have similar attribute values to the profiles of the women that the prospect rated. Similarity may be determined by comparing profiles and deducting points in proportion to differences in corresponding attribute values.

It is noted that there are many possible alternatives to the aggregation algorithm described above for use in inferring a prospect's profile from input ratings of other participants' overall profiles. Thus, the invention is not limited to any one inference algorithm, and others may readily be employed, without departing from the scope of the invention. For example, in one embodiment, various classification techniques from the field of statistical machine learning might be employed.

As a further note, for some attributes, a profile may provide values that are not disjoint. For example, a possible set of values for the attribute "wants children" is yes—flexible—undecided—no. "Flexible" in this case might indicate that Adam thinks he would be content with or without children. Such a choice may have other names such as "don't care," or "any," or the like. In one embodiment, if the inference algorithm used, such as the above described aggregation algorithm, has not caused Adam's "ideal match" "wants children" attribute to converge, and if such a "don't care" choice is available, then that value might be selected as a best guess inference.

The above progressive inference approach for profile matching provides numerous advantages over traditional approaches. For example, an average prospect is more likely to provide information incrementally than all in advance. This is because often the perceived effort is reduced. The reward for providing the information may also be received instantaneously because the prospect may compare their own data with that of a potential counterpart, relatively unencumbered. Moreover there may be reduced restrictions (or even no restrictions) on viewing other people's profiles (albeit while being limited from directly contacting them). As for the other participants, more people may see their profile and consider them as a potential match. To the online progressive profile matching provider, fewer prospects are likely to abandon participation before subscribing, thereby potentially increasing revenues.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device to manage an online profile matching activity, comprising:
   a transceiver to send and receive data over a network; and
   a processor that is operative to perform actions, comprising:
      receiving, from a viewer, a request to view at least one profile of a member to the online profile matching activity, wherein the viewer has not completed their own profile;
      enabling the viewer to view the at least one profile;
      receiving at least one input from the viewer about the viewed at least one profile;
      presenting to the viewer an inferred profile of the viewer based on the viewed at least one profile and the received at least one input from the viewer; and
      selectively preventing access to at least one other profile by the viewer based on a determination that a confidence level in the inferred profile is below a threshold.

2. The network device of claim 1, the processor being operative to perform actions, further comprising:
   receiving a request from the viewer to communicate with at least one member; and
   selectively allowing such communications based in part on a completeness level of the inferred profile for the viewer.

3. The network device of claim 1, wherein the at least one input from the viewer comprises a selection of at least one of an attribute about the viewer, an attribute about a member's profile being viewed, or a modification to an inferred attribute within the viewer's profile.

4. The network device of claim 1, wherein the inferred profile is determined using an aggregation algorithm, collaborative filtering, or a machine learning algorithm.

5. The network device of claim 1, wherein the online profile matching activity comprises at least one of an online dating activity, a shopping activity, or an employment search activity.

6. A processor readable storage medium that includes data and instructions, wherein the execution of the instructions on a computing device provides for managing activities within an online profile matching system by enabling actions, comprising:
   enabling a prospect to the profile matching system to view a plurality of profiles of members to the profile matching system although an incomplete profile is maintained about the prospect by the profile matching system;
   monitoring actions by the prospect in selecting profiles for viewing or inputs about the viewed profiles during viewing of the plurality of profiles;
   inferring attributes about the prospect or the prospect's desired match based on the monitored actions;
   revising the profile of the prospect based on the inferred attributes about the prospect;
   displaying on a computer screen the revised profile with at least one of the inferred attributes;
   determining a stability of an inferred attribute of the prospect's profile; and
   based on the stability of the inferred attribute being below a threshold, inhibiting access by the prospect from communicating with a member of the online profile matching system.

7. The processor readable storage medium of claim 6, wherein the prospect is un-restricted in access to viewing of the plurality of profiles of members.

8. The processor readable storage medium of claim 6, wherein inputs about the viewed profiles further comprises at least one of providing a text input, selecting from a plurality of selections for an attribute within the viewed profile, or modifying an inferred attribute selection.

9. The processor readable storage medium of claim 6, wherein viewed profiles comprise at least one of an "about me," or "an ideal match" for the member, a "your ideal match," or an "about me" for the prospect.

10. The processor readable storage medium of claim 6, wherein inferring attributes about the prospect further comprises employing an aggregation algorithm, or a statistical machine learning algorithm to determine an inference.

11. A method operating within a network device for managing activities to an online profile matching service, comprising:
   receiving a request at the network device to view one or more profiles of members to the matching service by a non-member to the matching service;
   enabling the non-member to view at a computing device the one or more profiles of members independent of becoming a member;
   monitoring by the network device actions by the non-member, including a selection of the one or more profiles, and any inputs by the non-member based on viewing of the one or more profiles of members;
   employing by the network device the monitored actions to generate inferences about the non-member;
   displaying at the computing device to the non-member a profile about the non-member based on the generated inferences;
   enabling the non-member to modify or confirm the non-member's profile; and
   by the network device, selectively allowing the non-member to communicate with a member based on whether the non-member's profile has fluctuations in the inferences that are below a threshold value.

12. The method of claim 11, wherein the inputs by the non-member further comprise at least one of a text comment, or a selection of an attribute option within the viewed profile wherein the attribute refers to the member or a characteristic of the non-member.

13. The method of claim 11, further comprising:
   if the non-member requests communications with a member, requiring the non-member to become a member prior to enabling the requested communications.

14. The method of claim 11, wherein the profiles of the members include at least one of an "about me," a member's "ideal match," or inferred information about the non-member.

15. A system for enabling activities in a profile matching service over a network, comprising:
   a data store having a plurality of profiles about members to the profile matching service; and
   a progressive profile manager configured to perform actions, including:
      receiving a request to view one or more profiles about members by a non-member to the matching service;

enabling the non-member to view the one or more profiles of members independent of becoming a member;

monitoring actions by the non-member, including a selection of the one or more profiles, and any inputs by the non-member based on viewing of the one or more profiles of members;

employing the monitored actions to generate inferences about the non-member;

displaying to the non-member a profile about the non-member based on the generated inferences;

enabling the non-member to modify or confirm the non-member's profile; and selectively preventing access to at least one other profile by the non-member based on a determination that a confidence level in the generated inferences is below a threshold.

16. The system of claim 15, wherein the progressive profile manager is configured to perform actions, further including:

selectively allowing a communications between the non-member and a member based on if the non-member becomes a member.

17. The system of claim 15, wherein inputs by the non-member further comprises annotating at least one attribute or other feature within a viewed profile.

18. The system of claim 15, wherein the profile matching service further comprises at least one of a dating service, an employment service, or a shopping service.

* * * * *